July 26, 1932.
M. BURGER
MACHINE FOR SETTING UP CARTONS
Re. 18,547
Original Filed Sept. 28, 1928 5 Sheets-Sheet 1
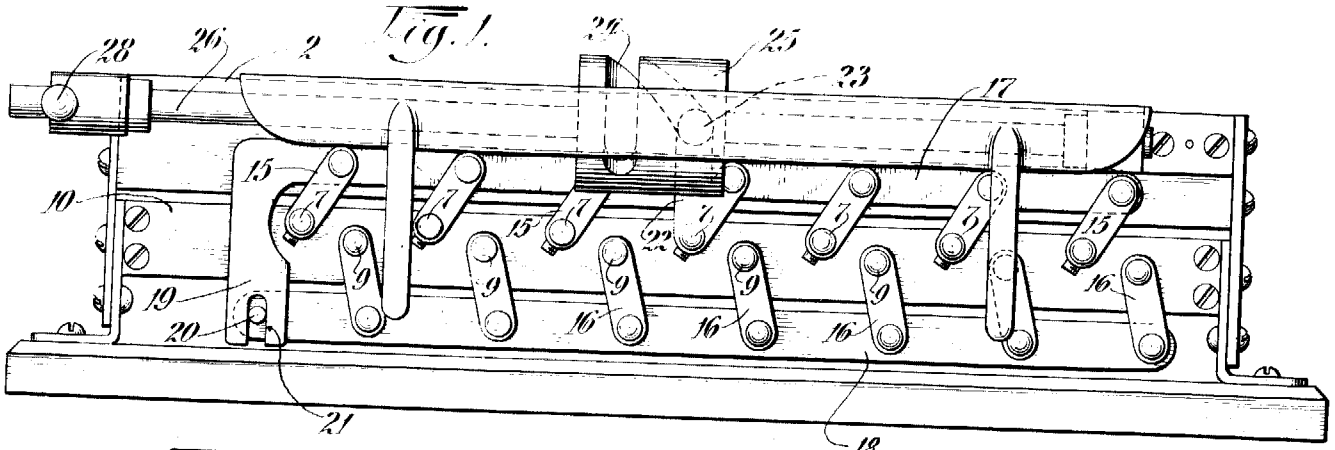
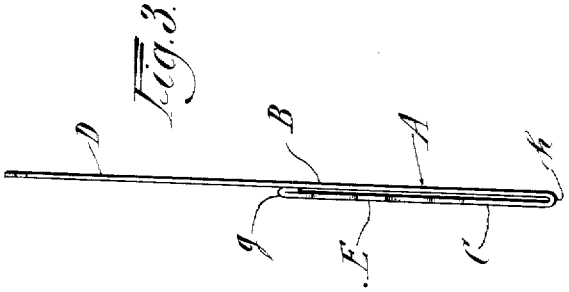
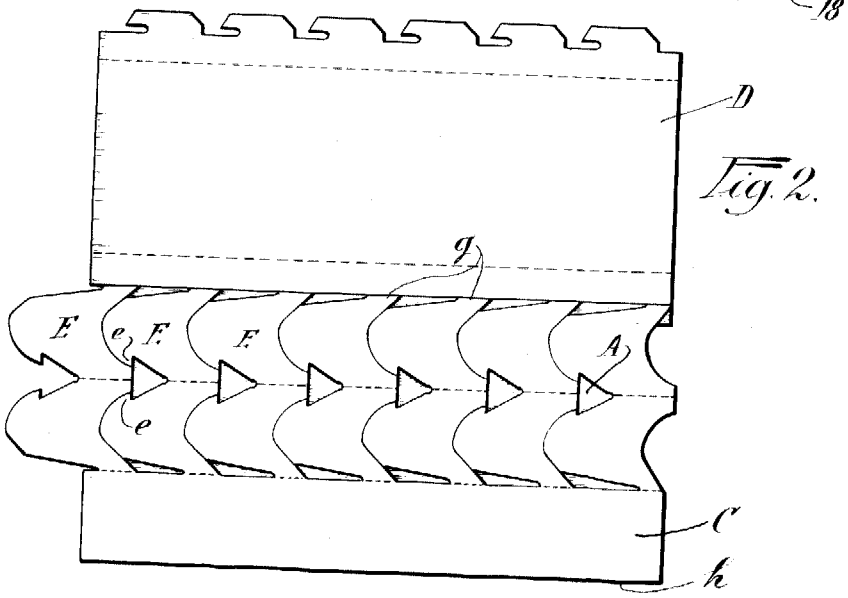
Inventor:
Martin Burger.
By Wm. F. Freudenreich
Attorney.

July 26, 1932.

M. BURGER

MACHINE FOR SETTING UP CARTONS

Re. 18,547

Original Filed Sept. 28, 1928

5 Sheets-Sheet 2

Inventor:
Martin Burger,
By Wm F. Freudenreich
Attorney.

July 26, 1932.

M. BURGER

MACHINE FOR SETTING UP CARTONS

Re. 18,547

Original Filed Sept. 28, 1928

5 Sheets-Sheet 3

Inventor:
Martin Burger.
By Wm. G. Freudenreich
Attorney.

M. BURGER

July 26, 1932. MACHINE FOR SETTING UP CARTONS Re. 18,547

Original Filed Sept. 28, 1928 5 Sheets-Sheet 4

Inventor:
Martin Burger,
By Wm. F. Freudenreich
Attorney.

July 26, 1932.

M. BURGER

MACHINE FOR SETTING UP CARTONS

Re. 18,547

Original Filed Sept. 28, 1928 5 Sheets-Sheet 5

Inventor:
Martin Burger,
By Wm F Frendenreich
Attorney.

Reissued July 26, 1932

Re. 18,547

UNITED STATES PATENT OFFICE

MARTIN BURGER, OF MORRIS, ILLINOIS

MACHINE FOR SETTING UP CARTONS

Original No. 1,738,034, dated December 3, 1929, Serial No. 308,963, filed September 28, 1928. Application for reissue filed November 25, 1931. Serial No. 577,372.

The present invention relates to a machine for setting up egg cartons, and has particular reference to a machine by which egg cartons in the form of stamped blanks may be set up to form a rigid container.

A type of egg carton which has met with considerable commercial success comprises a unitary wall structure having collapsed transverse partitions which may be integral with the wall structure or body of the carton, these partitions being adapted to be rotated or otherwise moved into erect positions and secured to other portions of the carton to maintain their position. In a preferred modification, the lower portion of the wall structure is pressed upwardly to form a longitudinal partition through the carton. Cartons of this type are delivered to the user in a collapsed or flattened condition, the wall structure being flattened out and the transverse partitions lying flat upon the same.

A primary object of the present invention is to provide a simple machine for facilitating the erection or setting up into useable form of a carton of the type described heretofore, that is, collapsible cartons of the type having cell-forming cross partitions adapted to be moved into erect position therein.

An additional object is to provide a device for maintaining the transverse partitions in a predetermined position and for bringing the wall structure of the carton into interlocking relation thereto.

Still another object is to provide means for aligning the transverse partitions with interlocking portions on the wall structure.

These and other objects of the invention will be seen from the following illustrative description of the invention and by reference to the accompanying drawings, wherein:

Figure 1 is a rear view of a machine embodying the present invention, in its normal open position;

Figure 3 is an edge view of the collapsed carton, the thickness of the material of which the carton is made being exaggerated;

Figure 4 is a top plan view of the machine, opened and having thereon a collapsed carton, but only part of the carton being shown;

Figure 2:
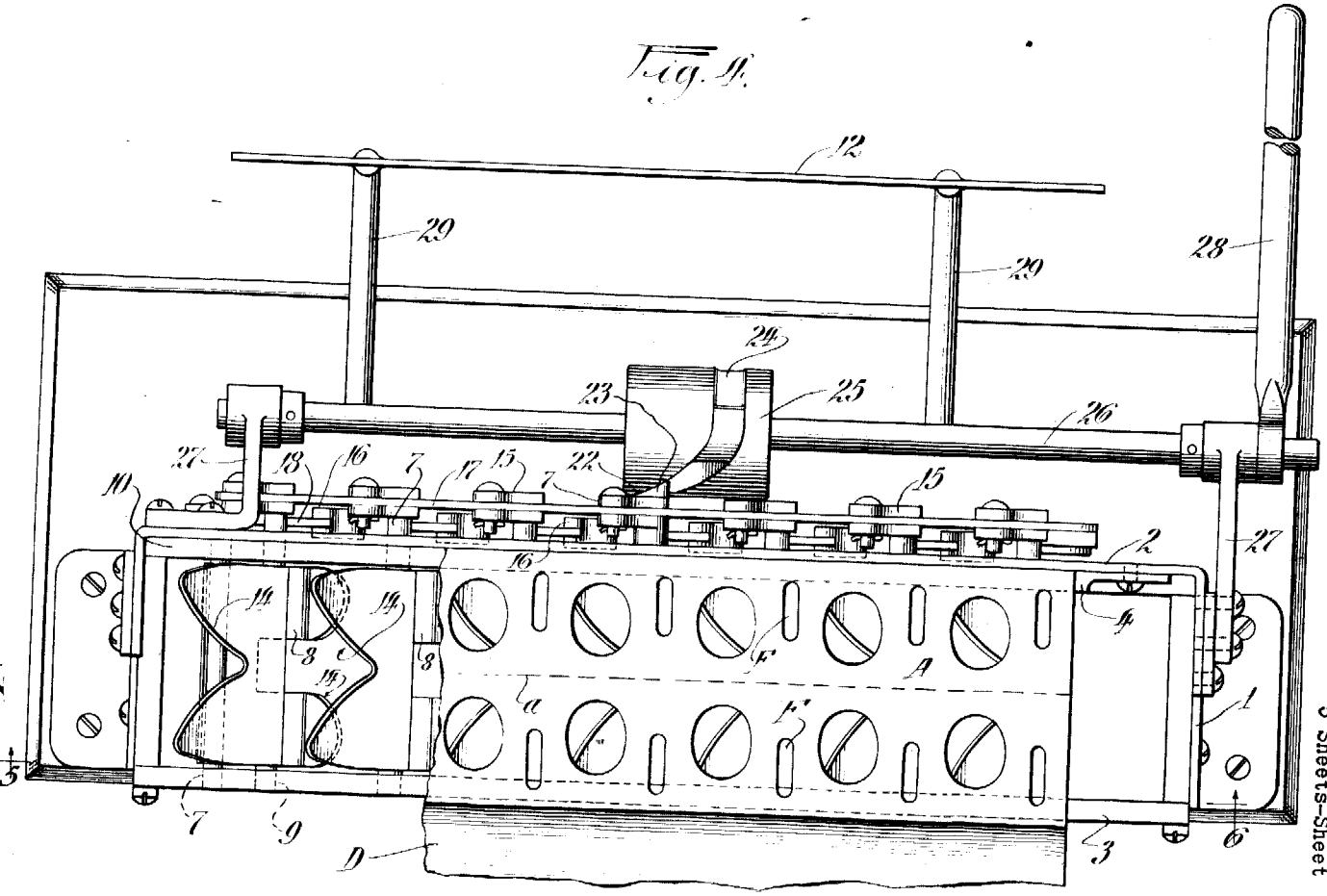
Figure 2 is a plan view of the collapsed carton, on a reduced scale.

While it is obvious that my invention is applicable to the erection or setting-up of collapsible egg cartons in general, for purposes of illustration and explanation it will be described with reference to a particular type of egg carton that has met with general favor in the art, which carton may be made of a single piece, as shown in the drawings, comprising a bottom section A, two side wall sections B and C, a cover section D and a false top divided into a series of transverse sections E, each integrally united with or secured to the two side sections at one end, so that it may be swung down into a vertical position when the carton is set up.

In the bottom of the carton are transverse slots F through which the hook-shaped lower ends *e* of the flaps may be pressed so as to be interlocked with the bottom of the carton. Each of the transverse partition elements has two of the hook-shaped portions, one on each side of the longitudinal center of the carton.

The bottom wall of the carton is scored along the longitudinal center line, as indicated at *a*, so that it may be folded along the center line in setting up the carton.

The carton is delivered to the user in the flattened condition illustrated in Figures 2 and 3. Upon pressing up what are the diagonally opposite long edges of the carton when set up, namely at the points *g* and *h* in Figure 3, the body of the carton may be opened up or distended into the form of a tube of rectangular cross-section; the transverse partition elements or flaps at this time lying at the top end parallel with the bottom which is still in a flattened condition. After the carton has been opened as just described the bottom must be pressed up so as to be in the form of an inverted V in cross-section, and the transverse partitions must be positioned and interlocked with the bottom. It is the purpose of my improved machine to perform these functions.

The machine comprises a suitable frame 1 which may be longitudinally extending and open at the top, the width of the frame being approximately equal to the width of the carton, and the length being somewhat greater than the length of the carton. What may be termed the rear wall or side 2 of the frame extends a considerable distance above the front wall or side 3. There is a stop 4 on the inner side of the rear wall near one end. The carton is to be set up, preferably after it has been opened or distended, as heretofore explained, is laid on the frame, upside down, with the rear side wall of the carton resting against the rear wall of the frame, and one end of the carton engaged with the stop; the carton being thus accurately located or positioned with respect to the frame.

Mounted within the opening in the frame are a series of pairs of grippers so disposed that they may be operated to engage with the transverse partition elements of the carton and swing them into upright positions; the grippers of each pair lying on opposite sides of the corresponding partition element and clamping the latter between the same so as to hold it accurately in a predetermined vertical position, namely in a position such that the hooks thereon are aligned with and register with the corresponding slots in the bottom wall of the carton. Means are provided for then pressing down the bottom of the carton in a plane parallel with the plane of the partitions and along the longitudinal center line, so as to force it into engagement with the hooks.

The grippers in the arrangement shown consist of a series of plates or wings 6 having shafts or trunnions 7 extending between and at right angles to the front and rear walls of the frame, together with a second series of wings or plates 8 also provided with shafts or trunnions 9 extending between and at right angles to the front and rear sides of the frame. The elements 6 may be simple flat plates radiating from their pivotal axis. In order to prevent interference between the element 8 of one pair of grippers and the element 6 of the next pair, the elements 8 are bent so as to be L-shaped. Therefore, the pivotal axis of each of the elements 8 may be displaced toward one side and below the pivotal axis of the cooperating gripping element. The parts are so disposed that each gripping element 8 extends downwardly and laterally underneath the pivotal axis of the corresponding gripper element 6, and then upwardly past such pivotal axis on the far side of the latter. Normally, when the machine is not in use, the plates 6 are all inclined in one direction and to the same extent, whereas the free arms or flanges of the elements 8 are inclined in the opposite directions. However, when the upper gripper elements are swung in the clockwise direction, as viewed in Figure 5, and the lower gripper elements are swung in the counterclockwise direction, the elements 6 may be brought into vertical positions with the free arms or flanges, or at least the ends of the latter, lying parallel therewith as shown in Figure 6.

Figure 5:
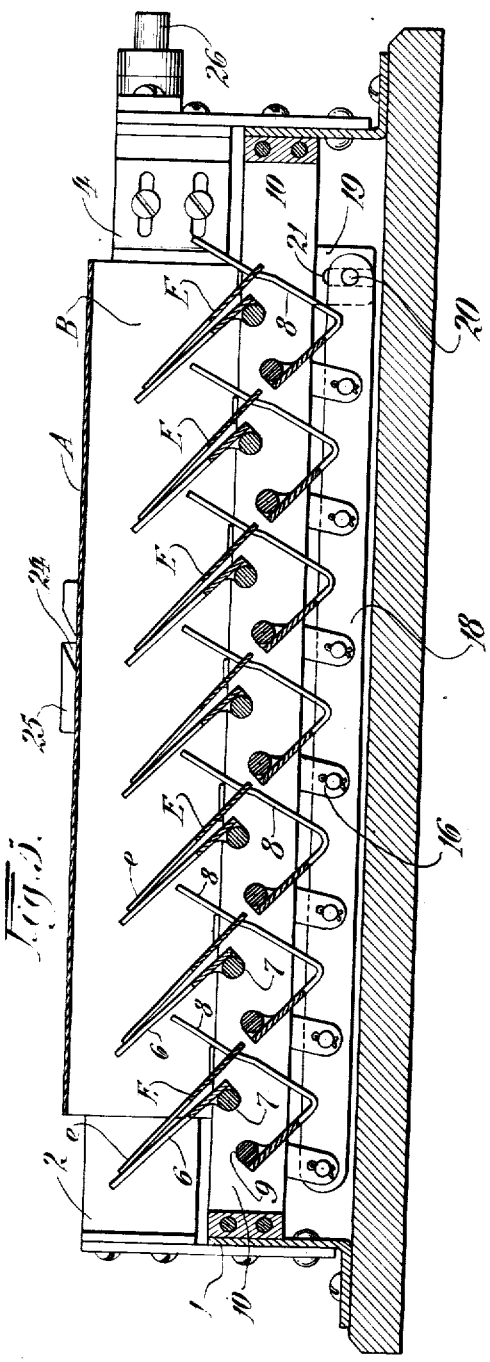
Figures 5 and 6 are sections taken approximately on line 5—6 of Figure 4, showing the parts of the machine in two different positions.
Figure 6:
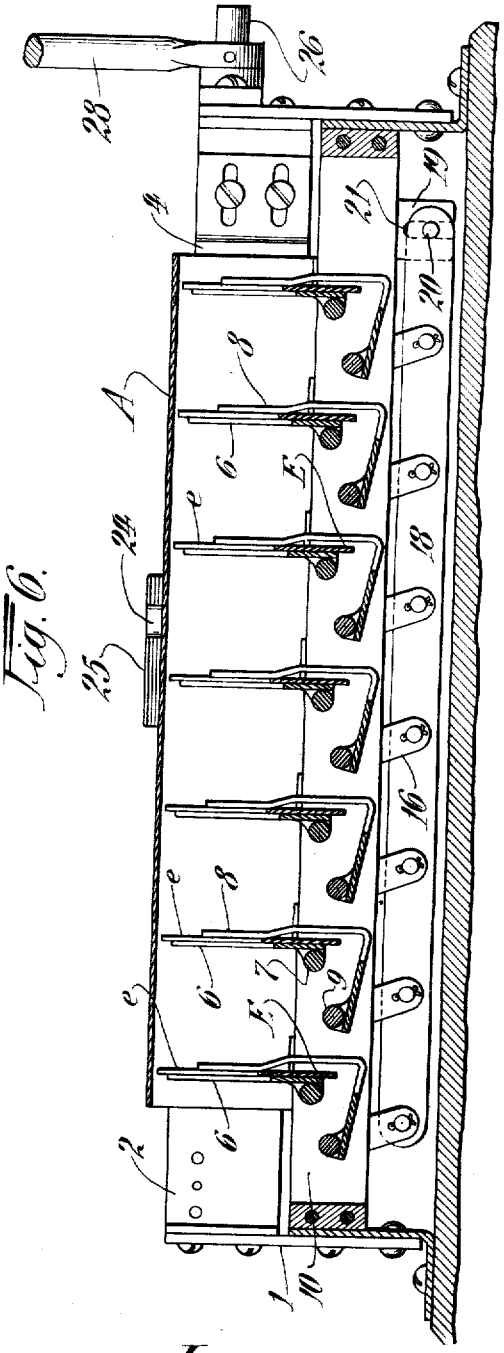
Figure 8:
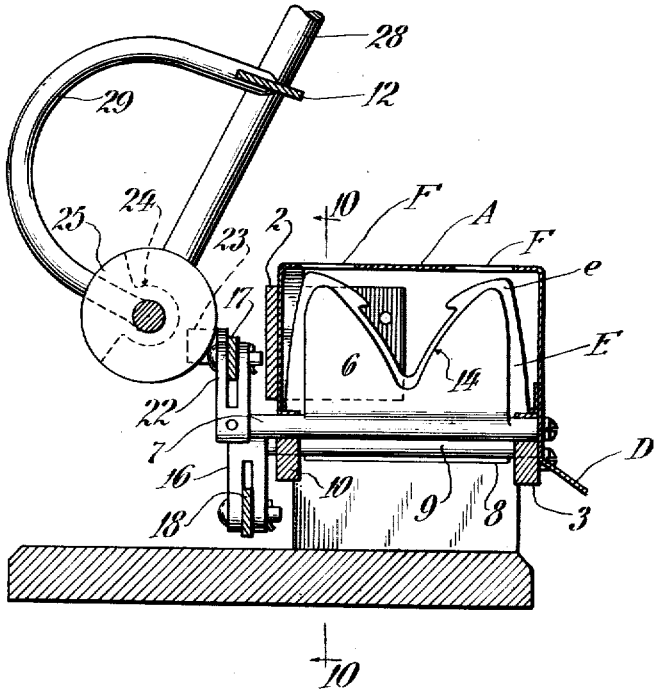
Figure 10:
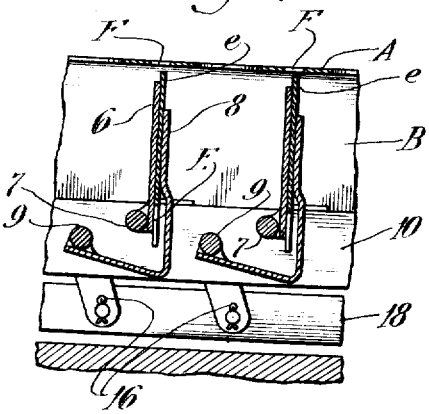
Figure 10 is a section taken on line 10—10 of Figure 8, showing only a fragment of the machine and carton.
Figure 11:
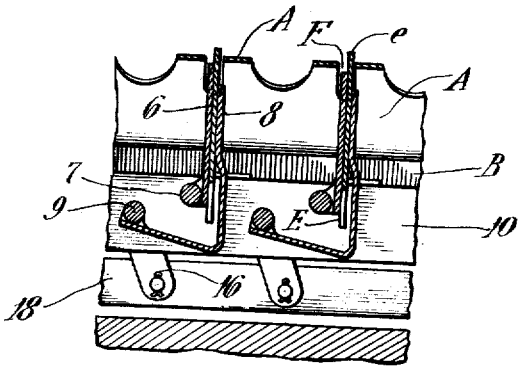
Figure 11 is a section taken on line 11—11 of Figure 9 and illustrating the same parts as in Figure 10.

The gripper elements being in the positions shown in Figure 5 and the inverted opened carton being pressed down on the same, it will be seen that the free ends of the transverse partitions or flaps E strike the gripper elements 6 and are partially swung up by the latter. When the carton is pressed down as far as it will go, it is brought to rest on the top of a rail 10 at the rear of the frame and on top of the front wall or rail 3; one side of the carton being engaged with the rear wall or bar 2 and one end with the stop 4. If now the gripper elements are swung up as heretofore explained, the elements 6 will gradually swing the flaps or partitions in the carton into vertical positions, whereas the free ends of the gripper elements 8 will swing over and engage with the opposite sides of the flaps or partitions. The result is that the flaps or partitions will be positively held in vertical or erect positions as indicated in Figures 6, 8 and 10 namely in registration with the slots F in the bottom of the carton.

Figure 9:
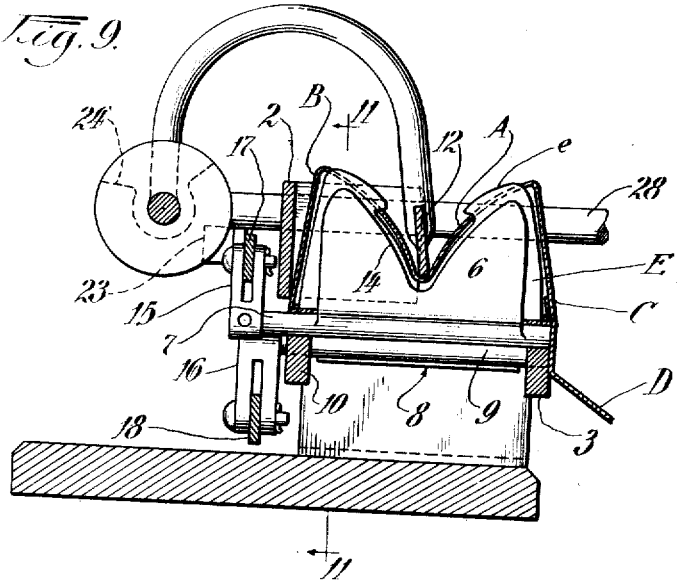
Figure 9 is a view similar to Figures 7 and 8, illustrating the final positions of the parts in the setting up of the carton.

After the flaps have been swung up and are held in upright positions a long knife blade 12 may be pressed down along the longitudinal center of the bottom, forcing the bottom into a trough-shape as best shown in Figure 9. As the bottom of the carton is depressed and deformed, the hooked ends *e* on the transverse partitions pass through the slots F, so that the free ends of the transverse partitions become interlocked with the bottom of the carton.

In order to permit the bottom of the carton to be pressed down into a trough shape, the central portions of the gripping plates are cut away at the top to form therein deep V-shaped notches 14, the open sides of which are almost as long as the width of the plates.

The partition engaging elements and the movable blade may be actuated in any suitable manner. In the arrangement shown, the shafts or trunnions for the gripper elements project at the rear side of the frame and the projecting end of each is provided with a radial arm fixed thereto. The arms connected with the upper shafts or trunnions 7 are indicated at 15 and those associated with the lower set of shafts or trunnions are indicated at 16. The arms 15 are all parallel with each other as are also the arms 16. The arms 15 are connected together by a suitable connecting rod 17, and a second connecting rod 18 extends between the free ends of the arm 16. The connecting rod 17 has an arm 19 extending downwardly from one end thereof past the rod 18. A pin 20 on the rod 18 projects into a vertical slot 21 in the arm 19. Consequently if one of the connecting rods is reciprocated in the direction of its length, the other will be given corresponding movements. One of the arms 7 is provided with an upward extension 22. On the part 22 is a roller 23 that extends into a cam groove 24 in a cam block 25 on the rear side of the machine. The cam block is fixed on a horizontal shaft 26 extending parallel with the longitudinal axis of the machine on the rear side of the latter. The shaft 26 is supported in suitable brackets 27 projecting rearwardly from the frame, or otherwise. An operating lever or handle 28 is fixed to and extends radially from one end of the shaft 26. The shaft 26 has thereon two arms 29, 29, each lying in a plane at right angles to the longitudinal axis of the shaft, and being of U-shape. The blade 12 extends between and is fixed to the outer ends of the arms 29.

Figure 7:
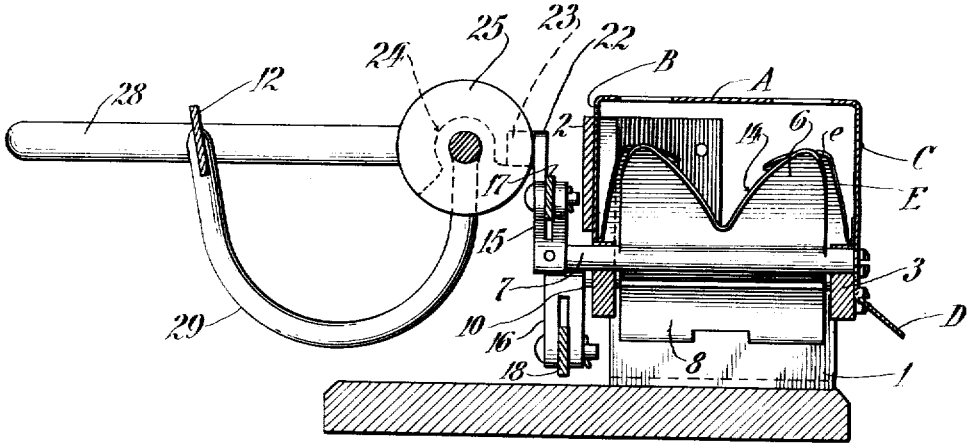
Figures 7 and 8 are transverse sections through Figures 5 and 6, respectively.

The cam groove 24 has an initial diagonal section and a final section whose long axis is in a plane at right angles to the long axis of the shaft 26. When the machine is open as shown in Figs. 1, 4, 5 and 7, the cam roller lies in that end of the inclined section of the cam groove remote from the final or terminal section. Consequently when the operating lever or handle 28 is swung up, the first result will be the shifting of the connecting rods 17 and 18 toward the left as viewed in Fig. 1 and toward the right as viewed in Fig. 4. In other words, the partition raisers and grippers will be swung from the positions shown in Fig. 5 to those shown in Fig. 6. Then, when the cam roller enters the straight portion of the cam groove, no further movement of the connecting rods can take place but they and the gripper elements are locked against displacement and the transverse partitions are positively held in upright positions. However, the blade 12 is permitted to swing down as the cam roller travels through the straight portion of the cam groove, into the position illustrated in Fig. 9. In other words, normally the operating lever or handle is horizontal as shown in Fig. 7, so that the carton may be placed in position on the machine. Then, when the handle is swung up into about the position in Fig. 8, the transverse partitions have been raised and definitely positioned in registration with the slots F in the bottom of the carton. As the swinging movement of the handle continues, the blade 12 descends and presses the longitudinal center of the bottom of the carton down until the condition illustrated in Fig. 9 is reached. Then, when the handle is again swung back into the position illustrated in Fig. 7, not only is the blade 12 moved out of the way, but the grippers are again opened and the carton, fully set up, may be lifted from the machine; the machine being then ready to receive another carton.

Either or both of the gripping elements of each pair may be made more or less resilient so as to insure a firm grip on the transverse partitions of the carton. Because of the greater length of the bent gripper elements, there will ordinarily be enough resiliency in the latter to permit the cooperating gripper elements to be made comparatively stiff and thus insure the accurate positioning of the partitions when the grippers are closed.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a machine of the character described, a series of pairs of grippers, means for supporting the grippers to permit those of each pair to move between a position in which they converge from the upper ends downwardly and a position in which they stand vertical in proximity to each other, and means for moving the grippers between said positions.

2. In a machine for setting up an egg carton having collapsed transverse partitions, positioning means for said carton, a series of plates pivotally mounted at their lower portion to said positioning means, means for rotating said plates about their pivoted portion to move said collapsed partitions into erect position, a longitudinal blade extending across said plates, and means for moving said blade to and from a position adjacent said plates.

3. In a machine for setting up an egg carton having collapsed partitions, a frame provided with positioning means for said egg carton, a series of upright plates mounted transversely of said positioning means, rotatable plates pivotally mounted adjacent the bases of said upright plates, means for rotating said plates about their pivoted portion to move said collapsed partitions into erect position and in engagement between said upright plates and said rotatable plates, and means for depressing the wall structure of said carton above said plates downwardly along its longitudinal center line.

4. In a machine of the character described, a frame open at the top, said frame having elements to support a carton inverted thereon and accurately position it lengthwise of the frame, a series of pairs of gripping jaws extending transversely across the frame and mounted thereon so as to be movable between positions in which the jaws of each pair stand close together and upright and positions in which the jaws are spread apart at the top, a blade adapted to be pressed down along the longitudinal center of a carton resting on the frame, and means for moving the jaws into their closed positions and subsequently forcing the blade down toward the same.

5. In a machine for setting up an egg carton having collapsed partitions, positioning means for said carton, a series of plates pivotally mounted at their lower portion transversely of said positioning means, said plates being cut away in their middle portion to form a central longitudinal opening, means for rotating said plates about their pivoted portion to move said collapsed partitions into erect position, a blade extending longitudinally along said positioning means, and reversible means for moving said blade downwardly into said longitudinal opening.

6. In a machine of the character described, a frame open at the top, devices arranged within the frame and distributed along the same to engage transverse partitions of a collapsed carton overlying the frame and set them in vertical positions, a blade extending across all of said devices, means for moving said blade between an idle position and a position in proximity to said devices, and means for operating said devices and said blade.

7. In a machine of the character described, a frame open at the top and adapted to support a collapsed carton having transverse partitions adapted to project at their free ends into the space within the frame, and means within the frame for gripping said flaps and setting them in upright positions.

8. In a device of the character described, supporting means for an egg carton having collapsed partitions, means for erecting said collapsed partitions, and means for causing engagement of interlocking portions of the erected partitions and said carton to form a rigid container.

9. In a device of the character described, supporting means for an egg carton having collapsed partitions pivoted to one portion of said carton, means for causing rotation of said collapsed partitions about said pivoted portion into erect position, and means for moving a second portion of said carton into engagement with said erect partitions.

10. In a device of the character described, positioning means for an egg carton having collapsed partitions, means for rotating said partitions into erect position, and means for rotating portions of said carton on each side of the central portion of said partitions into contact therewith to engage interlocking portions on said partitions and said carton.

11. In a device for setting up an egg carton having collapsed partitions, positioning means for said carton, and means for moving said partitions into planes substantially perpendicular to the walls of said carton and for aligning said partitions with interlocking portions on said walls.

12. In a device for setting up an egg carton having movable partitions and a unitary wall structure, positioning means for said carton, means for moving said partitions into planes perpendicular to said wall structure and for aligning said partitions with interlocking portions on said wall structure, and means for bringing the interlocking portions of said wall structure into engagement with said interlocking portions on said partitions to form a rigid container.

13. In a device for setting up an egg carton having movable partitions, an operating means, means responsive to said operating means for moving said partitions into erect position, and a second means responsive to said operating means for causing engagement of the wall structure of said carton with said partitions to form a rigid container.

14. In a device for setting up an egg carton having collapsed partitions, positioning means for said carton, means provided with an open center for moving said collapsed partitions into a plane substantially perpendicular to the walls of said carton, and means movable into and out of the open center of said last named means for moving said carton walls into engagement with said partitions.

15. In a device for setting up an egg carton having collapsed partitions, positioning means for said carton, means for moving said partitions into erect position, and means for moving interlocking portions on said partitions and on the walls of said carton into engagement to form a rigid container.

16. In a device for setting up an egg carton having collapsed partitions and a unitary wall structure, positioning means for said carton, means for holding said partitions in erect position, and means for moving said partitions and the wall structure of said carton into engagement to form a rigid container.

17. In a device for setting up an egg carton having collapsed cross partitions, supporting means for said carton, means for engaging said partitions and for rotating the same into positions at right angles to the wall structure of the carton, and means acting on said wall structure to cause movement of the same into engagement with said partitions.

18. In a device for setting up a collapsed carton of the type in which the bottom is folded along the longitudinal center to produce a ridge cooperating with movable transverse partitions to form two rows of cells, means for supporting said carton, means for shifting said partitions into positions at right angles to the wall structure of said carton, and means for folding the bottom of the carton at the center and for inserting said fold into openings in said partitions.

19. In a machine for setting up an egg carton having collapsed partitions and a unitary wall structure, a frame for supporting said carton in inverted position thereon, means on said frame for rotating the collapsed partitions into erect position, said means having an opening along the center thereof, a knife member extending longitudinally of said frame and above said last named means, and means for moving said knife into and out of the longitudinal opening in said last named means, whereby the bottom of said carton is depressed into engagement with said partitions to form a rigid container.

20. In a device for setting up an egg carton having collapsed partitions, positioning means for said carton, a lever, means responsive to partial movement of said lever for engaging said partitions and rotating the same to erect position, said means having a longitudinal opening through the center thereof, a knife bar mounted adjacent and spaced from the longitudinal opening in said last named means, means responsive to further movement of said lever for moving said knife bar into said longitudinal opening, and resilient means for returning said lever to its original position.

21. In a device for setting up egg cartons having cross partitions provided with notches and a resilient wall structure having openings adapted to interlock with said notches, supporting means for said carton, and means engaging said resilient wall structure for forcing the same into such position that said openings register with said notches, and for releasing said wall structure when in said position.

22. In a device for setting up collapsible egg cartons having pivoted cross partitions, a longitudinally extending frame, a series of transverse plates pivotally attached to said frame and rotatable into erect position, a bar connecting said plates, and means for imparting reciprocal motion to said bar to move said plates.

23. A device for setting up collapsible cartons having movable cross partitions, comprising a longitudinal frame, and a series of spaced partition engaging elements positioned on said frame, said partition engaging elements extending transversely of said frame and being operable to move cross partitions on said cartons from a collapsed position into an erect position substantially perpendicular to the body of the carton.

24. A device for setting up collapsible cartons having movable cross partitions, comprising a longitudinally extending frame, a series of spaced partition engaging elements extending transversely with respect to said frame, and means for producing relative movement between said elements and said frame whereby to move cross partitions on said cartons into erect position.

25. A device for setting up collapsible cartons of the type having cell-forming partitions, comprising a longitudinally extending frame including means upon which a distended carton may be positioned, and a partition engaging element movable with respect to said frame and operable to position an erected partition within a distended carton on said frame.

26. A device for setting up collapsible cartons of the type having cell-forming cross partitions, which comprises a frame including means for positioning one of said cartons, a plurality of spaced movable plates positioned on said frame, and a single operating means for causing movement of said plates, whereby cross partitions on said carton are moved into an erect position.

27. A device for erecting a collapsible carton of the type having cell-forming cross partitions, comprising a longitudinally extending frame including means for positioning one of said cartons, means for moving cross partitions into erect position in said carton, a lever, and means responsive to movement of said lever for actuating said cross partition moving means.

28. A device for setting up collapsible cartons having movable cross partitions, comprising a frame, a series of partition engaging elements, and means for producing relative movement between a carton positioned on said device and said partition engaging elements, whereby to move cross partitions on said carton into erect position.

29. A device for setting up collapsible cartons having movable cross partitions, comprising a longitudinally extending frame, centrally spaced partition engaging elements extending transversely of said frame, actuating means, and means responsive to said actuating means for producing relative motion between a carton on said device and said partition engaging means, whereby to move cross partitions on said carton into erect position.

30. In a device for setting up collapsible cartons of the type having cross partitions, a longitudinally extending frame, and a series of upwardly extending partition engaging elements on said frame in positions corresponding to the position of the cross partitions on said cartons, whereby said cross partitions are rotated toward erect position when a carton is placed on said device.

31. In a device for setting up collapsible cartons of the type having a longitudinal partition and a series of cell-forming cross partitions, a losgitudinally extending frame, and two series of partition engaging elements on said frame in positions corresponding to the positions of the cross partitions on said cartons, whereby said cross partitions are rotated toward erect position when a carton is placed on said device, said two series of partition engaging elements being transversely spaced to provide an opening for the longitudinal partitions on said cartons.

32. In a device for erecting collapsible cartons of the type having hinged cross partitions, a longitudinally extending frame, and a series of upwardly extending plates movably mounted to said frame in positions corresponding to the positions of the cross partitions on said cartons, and a single means for moving said plates relative to said frame whereby to rotate said hinged cross partitions into erect position.

33. A device for setting up egg cartons of the type having hinged cross partitions, a longitudinally extending base, a series of partition engaging elements positioned on said base, a lever, and means responsive to actuation of said lever for producing relative movement between a carton positioned on said device and said partition engaging elements, whereby said hinged cross partitions are rotated into erect position.

In testimony whereof I have hereunto subscribed my name.

MARTIN BURGER.

CERTIFICATE OF CORRECTION.

Reissue No. 18,547. July 26, 1932.

MARTIN BURGER.

It is hereby certified that the above numbered patent was erroneously issued to the inventor said "Burger", whereas said patent should have been issued to "Self-Locking Carton Co., a corporation of Illinois", as assignee of the entire interest in said invention, as shown by the records of assignments in this office; and that the said Letters Patent should be read with this correction therein that the same may conform to the record of the case in the Patent Office.

Signed and sealed this 6th day of December, A. D. 1932.

(Seal)

M. J. Moore,
Acting Commissioner of Patents.